(12) United States Patent
Sami et al.

(10) Patent No.: US 11,139,728 B2
(45) Date of Patent: *Oct. 5, 2021

(54) COIL-OSCILLATOR VIBRATION UNIT FOR RAIL WORKHEAD

(71) Applicant: HARSCO TECHNOLOGIES LLC, Fairmont, MN (US)

(72) Inventors: Reza Sami, Irmo, SC (US); Kendall Koon, Lexington, SC (US)

(73) Assignee: HARSCO TECHNOLOGIES LLC, Fairmont, MN (US)

( * ) Notice: Subject to any disclaimer, the term of this patent is extended or adjusted under 35 U.S.C. 154(b) by 52 days.

This patent is subject to a terminal disclaimer.

(21) Appl. No.: 16/559,002

(22) Filed: Sep. 3, 2019

(65) Prior Publication Data

US 2020/0169154 A1 May 28, 2020

Related U.S. Application Data

(63) Continuation of application No. 16/017,405, filed on Jun. 25, 2018, now Pat. No. 10,404,148, which is a
(Continued)

(51) Int. Cl.
| | |
|---|---|
| *H02K 33/00* | (2006.01) |
| *H02K 1/12* | (2006.01) |
| *H02K 1/22* | (2006.01) |
| *H02K 11/30* | (2016.01) |
| *H02K 33/12* | (2006.01) |

(Continued)

(52) U.S. Cl.
CPC ............ *H02K 33/00* (2013.01); *B06B 1/045* (2013.01); *E01B 27/16* (2013.01); *H02K 1/12* (2013.01); *H02K 1/22* (2013.01); *H02K 11/30* (2016.01); *H02K 33/12* (2013.01)

(58) Field of Classification Search
CPC ........... E01B 27/16; E01B 27/20; H02K 1/12; H02K 1/22; H02K 11/30; H02K 33/00; H02K 33/12; B06B 1/045
See application file for complete search history.

(56) References Cited

U.S. PATENT DOCUMENTS

| | | | | |
|---|---|---|---|---|
| 4,111,129 A | * | 9/1978 | von Beckmann | ....... E01B 27/16 104/10 |
| 4,332,200 A | * | 6/1982 | Ganz | ........................ E01B 27/16 104/12 |

(Continued)

FOREIGN PATENT DOCUMENTS

JP        201552243        3/2015

OTHER PUBLICATIONS

"Inventions & Experiments of Nikola Tesla" Accessed http://teslasearch.jimdo.com/book-1/the-inventions-researches-and-writings-of-nikola-tesla-by-thomas-commerford-martin-second-edition-new-york-press-of-milroy-emmet-1894/ Chapter 3, p. 9.
(Continued)

*Primary Examiner* — Jason C Smith
(74) *Attorney, Agent, or Firm* — Norton Rose Fulbright US LLP (57) ABSTRACT

A rail maintenance vehicle includes a frame, a workhead, and a vibrating unit. The frame includes wheels that travel along rails. The vibrating unit is coupled to the workhead and includes a rotor, a stator, a first rotor coil coupled to the rotor and a first stator coil coupled to the stator.

20 Claims, 5 Drawing Sheets

Related U.S. Application Data continuation of application No. 15/211,769, filed on Jul. 15, 2016, now Pat. No. 10,008,914.

(60) Provisional application No. 62/193,375, filed on Jul. 16, 2015.

(51) Int. Cl.
 *E01B 27/16* (2006.01)
 *B06B 1/04* (2006.01)

(56) References Cited

U.S. PATENT DOCUMENTS

| | | | | |
|---|---|---|---|---|
| 4,449,459 | A * | 5/1984 | Cicin-Sain | E01B 27/16 104/12 |
| 5,736,797 | A * | 4/1998 | Motohashi | H02K 33/16 310/36 |
| 9,124,159 | B2 * | 9/2015 | Yamada | H02K 19/12 |
| 2012/0313492 | A1 * | 12/2012 | Yamada | H02K 19/12 310/68 D |
| 2017/0009404 | A1 * | 1/2017 | Vargas | E01B 27/16 |
| 2017/0019012 | A1 * | 1/2017 | Sami | E01B 27/16 |
| 2018/0309353 | A1 * | 10/2018 | Sami | H02K 11/30 |

OTHER PUBLICATIONS

European Search Report Issued in Corresponding European Patent Application 16825267.4, dated Mar. 6, 2019.
International Search Report and Written Opinion Issued in Corresponding PCT Patent Application No. PCT/US2016/042574, dated Oct. 18, 2016.

\* cited by examiner

COIL-OSCILLATOR VIBRATION UNIT FOR RAIL WORKHEAD

CROSS-REFERENCE TO RELATED APPLICATIONS

This application is a Continuation application of U.S. patent application Ser. No. 16/017,405, filed Jun. 25, 2018, which is a continuation application of U.S. patent application Ser. No. 15/211,769 filed on Jul. 15, 2019 which claims priority to U.S. Provisional Application Ser. No. 62/193,375, filed on Jul. 16, 2015, each of which applications are hereby incorporated by reference in their respective entireties.

BACKGROUND

Generally, railroad tracks include a pair of parallel rails coupled to a series of laterally extending ties (or sleepers). Ties may be made from concrete or wood. Each tie is coupled to the rails by metal tie plates and/or spring clips. The ties are disposed on a ballast bed. The ballast may be a hard particulate material, such as gravel. The ballast filled space between the ties is called a crib.

Although appearing rigid, rails are flexible members that can bend and distort, for example under the load of trains passing over. The ballast acts like a cushion absorbing some of the shock. Ballast can also help keep the rail level and allow moisture and rain water to drain away.

During installation and maintenance, ballast may be "tamped" to maintain proper position of the ties. Tamping involves agitating the ballast to allow the particles to re-position, and compact it under the tie. Tampers may also track stabilizer workheads for applying pressure to a track structure.

A tamping device includes one or more workheads mounted on a motorized vehicle that travels on the rails. A workhead may include a pair of elongated, vertically extending tools structured to move together vertically and horizontally in a pincer-like motion. The workhead may have two sets of tools spaced so that each tool may be disposed on opposite lateral sides of a rail. The workhead may further include a vibration device configured to rapidly vibrate the tools.

The vibration device is generally a hydraulic actuator, which may require many components to drive such as hoses, hydraulic circuit pumps, tanks and filters. Moving parts in the hydraulic systems may wear and fail. The hydraulic systems may also leak requiring work stoppage for maintenance. A vibration device of greater efficiency and reliability would be advantageous.

BRIEF SUMMARY

In an embodiment, a rail maintenance vehicle includes a frame, a workhead, and a vibrating unit. The frame includes wheels that travel along rails. The vibrating unit is coupled to the workhead and includes a rotor, a stator, a first rotor coil coupled to the rotor and a first stator coil coupled to the stator.

In another embodiment, a vibration unit for a rail vehicle includes a rotor, a stator, a first rotor coil, a second rotor coil, a first stator coil, a second stator coil and a controller. The first rotor coil is coupled to the rotor. The second rotor coil is coupled to the rotor. The first stator coil is coupled to the stator and proximal to the first rotor coil. The second stator coil is coupled to the stator and proximal to the second rotor coil. The controller is operable to alternatingly cause the first rotor coil and the first stator coil to have a first state and the second rotor col and the second stator coil to have a second state.

DETAILED DESCRIPTION

Embodiments of a coil-oscillator vibrator unit and related methods for applying vibration to a work head in a rail vehicle are described. It is to be understood, however, that the following explanation is merely exemplary in describing the devices and methods of the present disclosure. Accordingly, any number of reasonable and foreseeable modifications, changes, and/or substitutions are contemplated without departing from the spirit and scope of the present disclosure.

Figure 1:
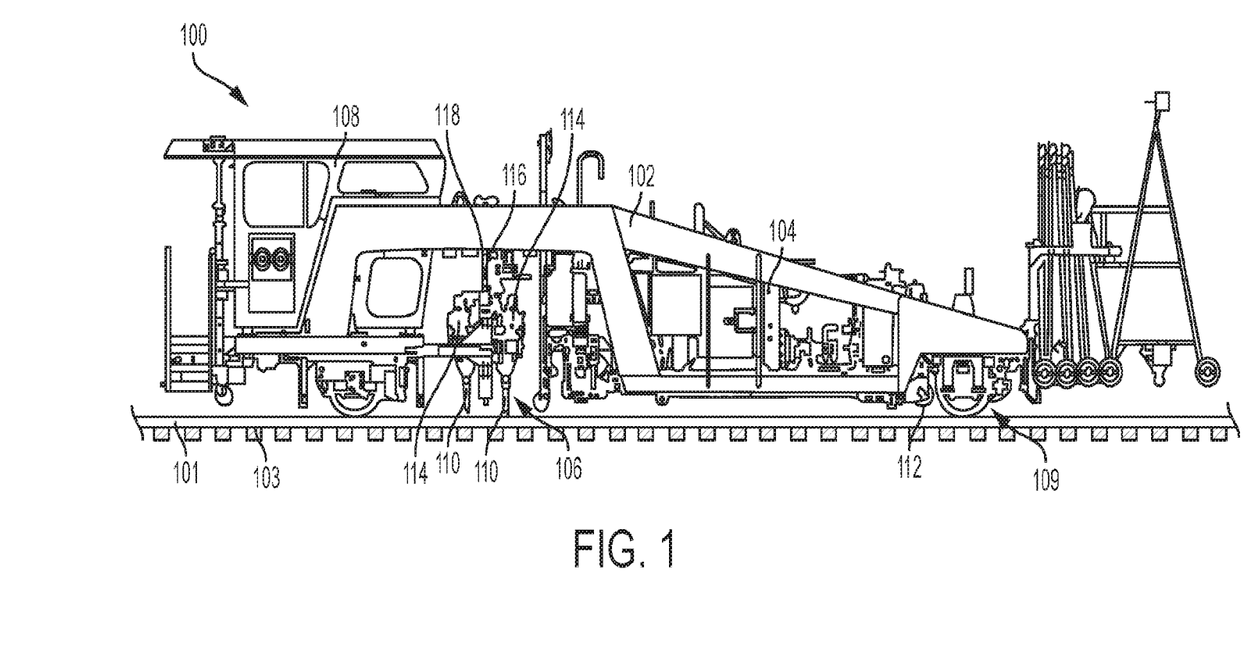
FIG. 1 shows a tamping machine rail vehicle where a coil-oscillator vibrator unit can be implemented, according to an example embodiment.
Figure 2:
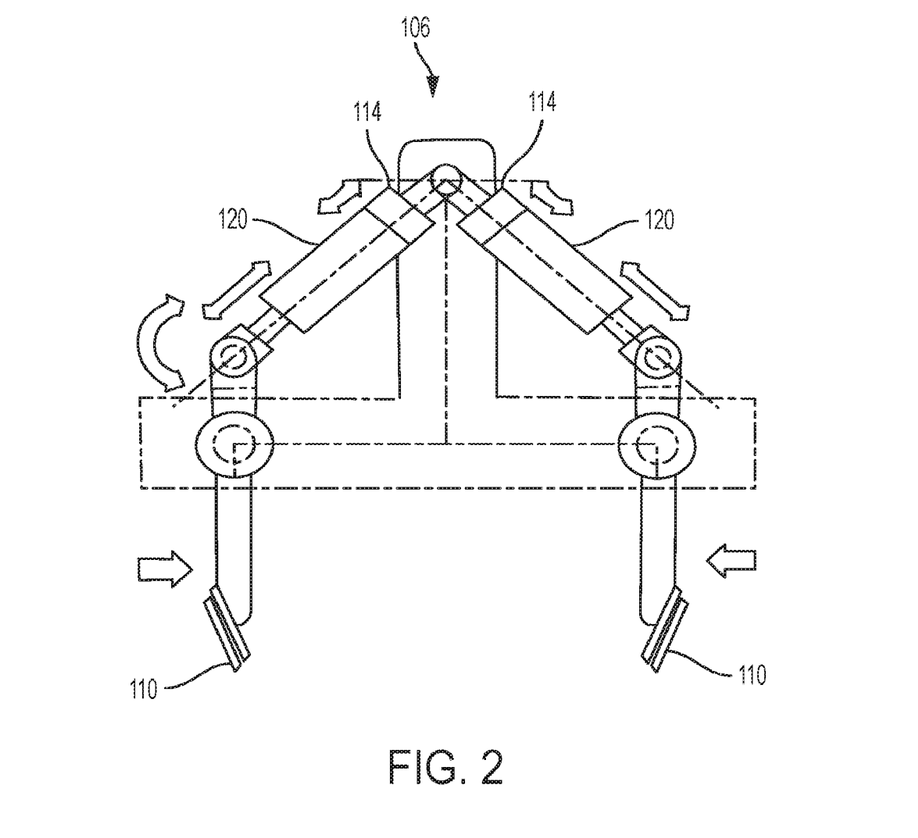
FIG. 2 shows a front view of a tamping workhead assembly.

In an embodiment, the coil-oscillator vibrator unit is employed in a tamping machine rail vehicle, as illustrated in FIGS. 1 and 2. FIG. 1 shows a tamping vehicle 100 that includes a frame assembly 102, a propulsion device 104, a tamping device 106, and a cabin 108. Frame assembly 102 includes a plurality of rigid frame members and a plurality of wheels 109 that are configured to travel on the pair of rails 101. Tamping vehicle 100 travels across a pair of rails 101, disposed over a series of rail ties 103. The rails 101 and series of ties 103 are disposed over a bed of ballast. The propulsion system 104 is configured to move tamping vehicle 100. The tamping device 106 is configured to tamp rail ties 103.

The tamping device 106 may include multiple workheads. In the side view of FIG. 1, one workhead can be viewed while another workhead is also included at an opposite side corresponding with the other rail. Any number of workheads (2, 4, etc) may be included. The tamping device 106 includes paddles 110 that are lowered into the ballast. The paddles 110 are vibrated by vibrators 114. The paddles 110 may be actuated by actuators 120, which may be hydraulic, to squeeze the paddles around the rail ties. The tamping device 106 is coupled to the frame assembly 102 via a subframe 116 and an actuator 118. The actuator 118 is preferably a hydraulic actuator and is operable to lower the tamping device 106 such that the paddles 110 are inserted into the ballast where the squeezing and vibration action tamps the ballast. The vibrators 114 may couple to or be integrated with the actuators 120. In a work cycle, the tamping vehicle 100 advances to position the tamping device 106 over a tie. The actuator 118 is actuated to lower the tamping device 106 to carry out the tamping of the ballast by actuation of the vibrators 114. Then, the actuator 118 is actuated to raise (and in some cases stow) the tamping device 106 for travel to the next tie.

Figure 3:
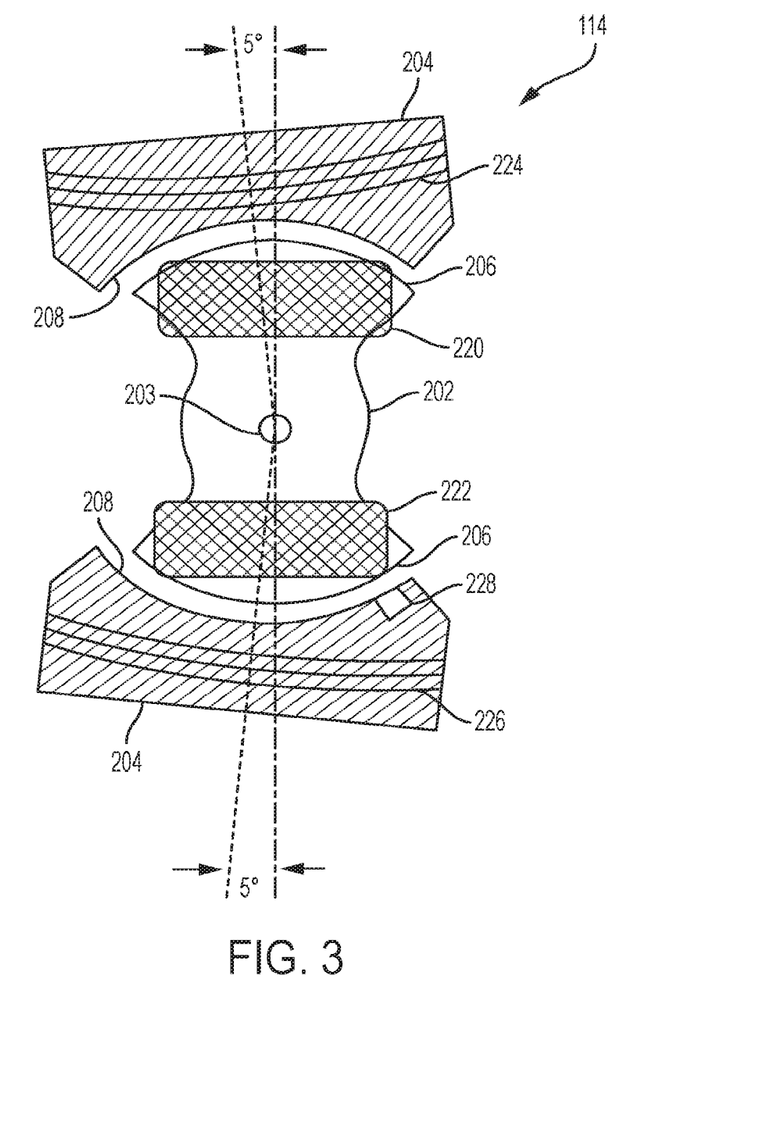
FIG. 3 shows a top view of an electrically driven vibrating unit.
Figure 4:
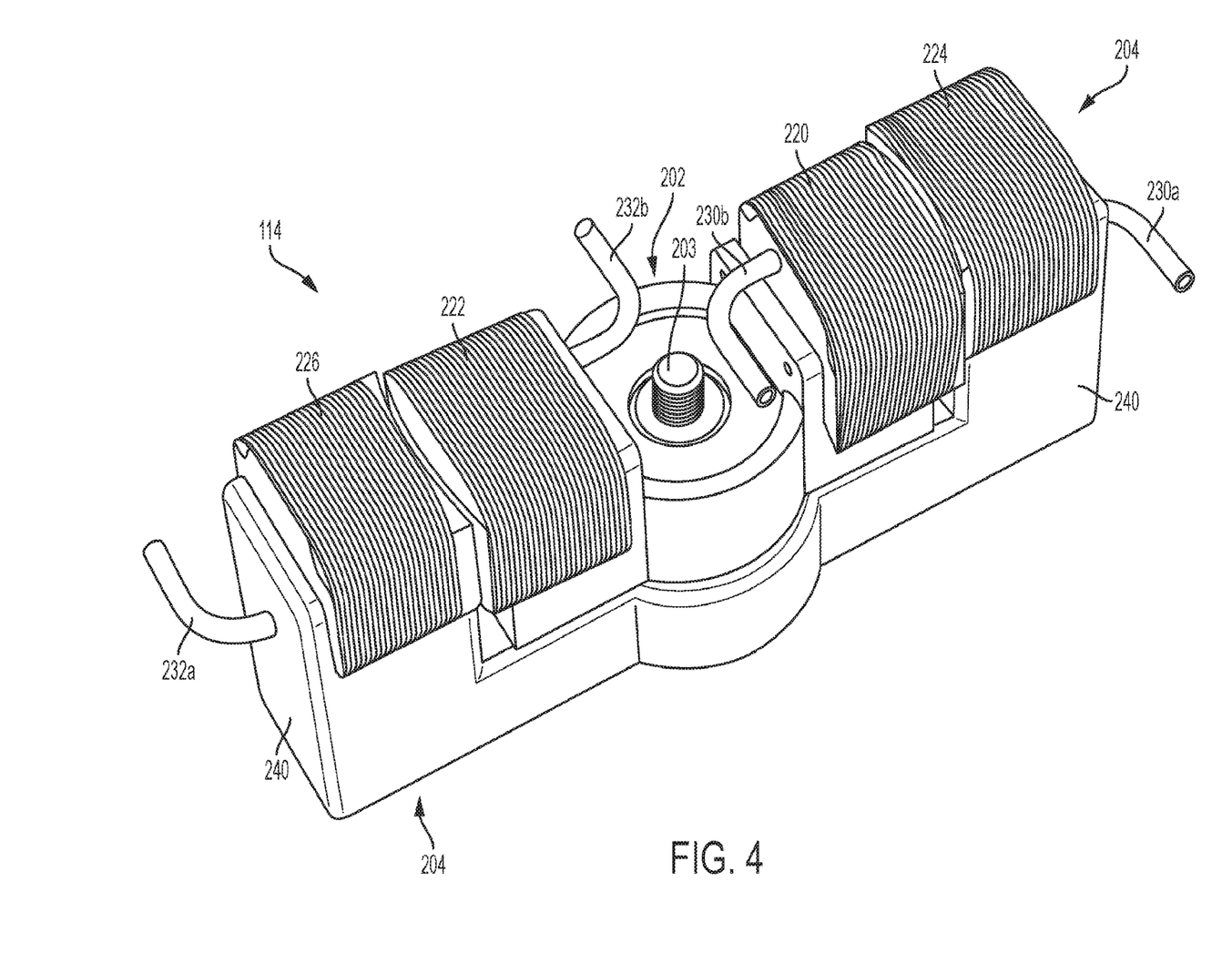
FIG. 4 shows a perspective view of an electrically driven vibrating unit.

FIG. 3 shows a top view of an electrically driven vibrating unit. FIG. 4 shows a perspective view of an electrically driven vibrating unit. With reference to FIGS. 3 and 4, the vibrator 114 includes a rotor 202 and a stator 204. The pole faces 206 on the rotor are convex and complementary to the concave pole faces 208 on the stator. The complementary convex-concave profiles allow a constant air gap to be maintained between their surfaces. A constant air gap provides for more consistent and reliable coupling between rotor and the stator as these faces act as the pole faces of the magnet.

In a resting position, the axis of rotation of the rotor may be slightly offset from the center axis of the coils to allow movement to start in a predictable direction by operation of the strength of the force vectors generated by the flux in the coils. The offset allows for predictable startup and operation while reducing the complexity of the controller as it may not be necessary to know an absolute position of the rotor while still permitting predictable startup and operation of the vibrator. The offset may be provided, for example, a central axis of each stator portion may form an angle with a central axis of the rotor. Both stator portions may be offset to the same side of the central axis of the rotor.

The rotor 202 may be wedge or hour glass shaped to proved greater mass distal from the center shaft 203. These larger masses may increase the energy in the oscillations. In an embodiment, the oscillations may be about 2 degrees (less than the resting offset). The energy needed to tamp ballast is very high. Thus, the geometry of the rotor is particularly advantageous in the rail maintenance context to provide a compact but powerful vibrator.

The rotor 202 and the stator 204 may each include two coils: a first rotor coil 220, a second rotor coil 222, a first stator coil 224, and a second stator coil 226. The coils may be respectively wound around an exterior of the rotor and stator. The coils may also be wound in an annular opening within the rotor and/or stator such that a diameter of the coils are substantially uniform. A partial rotation can be achieved by energizing coils on the rotor and stator with opposing fields. Reversal of the flux at a partial rotation can be achieved to deliver a torque oscillation.

The rotor 202 may achieve clockwise movement when coils 224 and 220 have the same polarity and coils 222 and 226 have reverse polarity. The offset of the rotor, for example five degrees, initiates a torque due to slip. In the view of FIG. 3, applying the same polarity to the coils 220 and 224 causes a force at the coil 220 in the right hand direction. Because the rotor is mounted on a pivot (e.g., a shaft 203), this causes an angular displacement. Conversely, the rotor 202 may achieve counter-clockwise movement when coils 220 and 224 have reverse polarity and coils 222 and 226 have the same polarity. Optionally, the coils may be de-energized in one phase of the oscillation. For example, where the coils are described above as having the reverse polarity, the coils may instead be de-energized and the oscillatory movement provided by the coils alternatingly having the same polarity. As another example, where the coils are described above as having the same polarity, the coils may instead be de-energized and the oscillatory movement provided by the coils alternatingly having reverse polarity.

The coils 224 and 220 may be coupled by a flexible conductor. The coils 226 and 222 may also be coupled by a flexible conductor. The electrically coupled coils 224 and 220 may be coupled to a controller via conductors 230a and 230b. The electrically coupled coils 226 and 222 may be coupled to a controller via conductors 232a and 232b.

The oscillatory displacement of the rotor 202 relative to the stator 204 may be small. In an embodiment, the rotor 202 oscillates 2 degrees. A flexible conductor can therefore couple to the coils 220 and 222 of the rotor to the coils 224 and 226 of the stator with limited mechanical strain. Other than conductors for the coils and the pivot shaft 203, the rotor 202 may be free to rotate and does not require any further contact to the stator. For example, this may eliminate brushes, commutators, and other mechanical couplings that wear providing improved longevity of the vibrator. The flexible conductors and conductors 230b and 232b do not significantly affect the ability of the rotor 202 to oscillate freely about the shaft 203. The stator 204, and thereby also the vibrator 114 may be secured to a machine via the fixed mount 240. As the rotor 202 has low friction with the stator 204, the vibrator 114 may be very efficient and have a long useful life.

Figure 5:
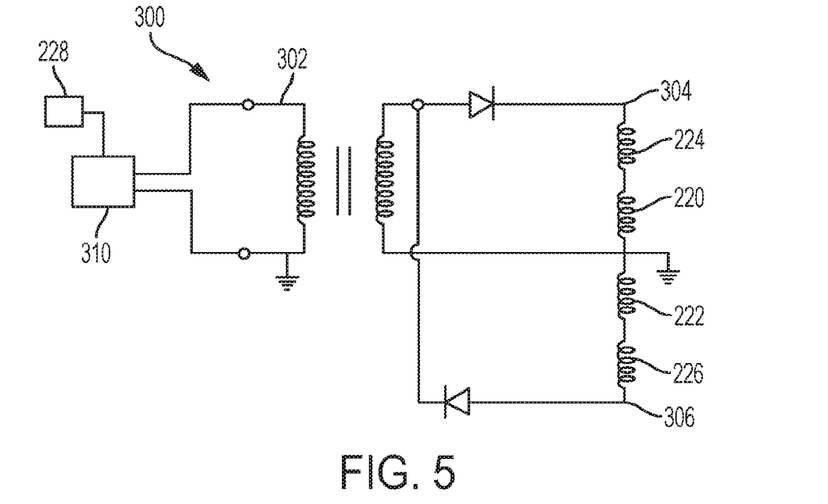
FIG. 5 shows a circuit diagram that may drive a coil-oscillator.
Figure 6:
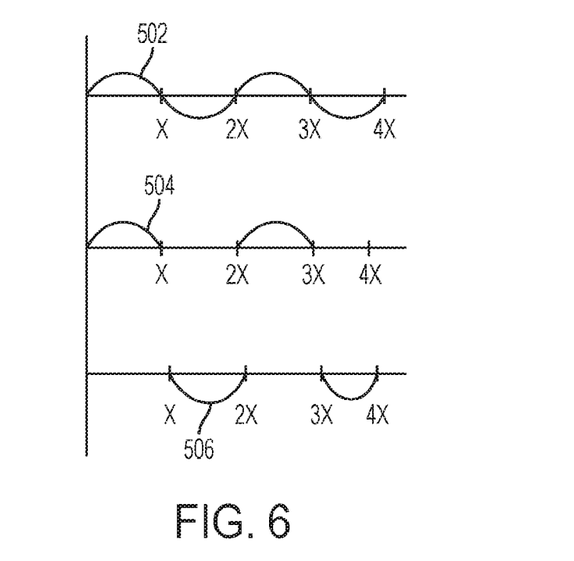
FIG. 6 shows electrical waveforms of the circuit of FIG. 5.

FIG. 5 shows an exemplary dual half-wave rectifier circuit 300 that can be used to control a push-pull system that alternatively repel and pull causing the rotor 202 to oscillate and give a torque on a shaft 203. In another example, the circuit 300 may be used to control an alternating push-opposing push or alternating pull-opposing pull to provide the oscillations. The dual half wave rectification circuit may split the input current into two half wave forms that are out of phase causing alternating repelling and attracting forces that in turn cause the rotor 202 to oscillate and apply a torque on the shaft 203. FIG. 6 shows exemplary wave forms of the circuit 300. The coils can be alternatively energized in pairs via a half-wave electrical rectifier circuits to oscillate the rotor 202. Waveform 502 is a alternating current pulse, for example 60 Hz, at point 302 of the circuit 302. The coils 220 and 224 are connected to an output of a first half-wave rectifier. The voltage waveform at 304, supplied to the coils 220 and 224, is shown as waveform 504. The coils 222 and 226 are connected to an output of a second half-wave rectifier. The voltage waveform at 306, supplied to the coils 222 and 226, is shown as waveform 506. In this way, the coils are alternately provided a same polarity to induce oscillations as discussed above. Also, the frequency can be varied by a Variable-Frequency (VF) controller such as via pulse width modulation. Variation in vibration frequency may provide an advantage to adjust the vibration for the size of the ballast. For example, more tightly packed ballast may by tamped better by applying higher frequency vibrations. The coil oscillator can be easily adjusted, for example, by an operator with a simple adjustment to the controller. By increasing the current and voltage a high torque (for example on the order of 1500-2000 Nm) can be achieved. It will be appreciated that the sinusoidal waveforms shown in the drawings are exemplary and other waveforms (square waves, triangle waves, etc.) may also be used.

A controller 310 may also receive location information from a sensor (e.g., a solid state position sensor, a hall effect sensor, etc.) 228. The controller 310 may use this information to control the frequency of the oscillations and also the resting location of the rotor 202. The controller may adjust the amplitude of the positive and negative signals supplied to the circuit 300 to balance the rotor 202 at a desired offset angle. Preferably, the offset angle is 5 degrees. It will be appreciated that an exemplary benefit of including a coil on the rotor 202 and providing the offset position is that a position sensor is not necessary. Thus, costs and complexity in the controller may be reduced.

By using coil-oscillator vibrator unit, a vibrating workhead may achieve control of the vibration frequency. For example, the vibration frequency can be adjusted to suit ballast conditions. The reduction in contacting parts can improve the wear of the oscillating vibrator. Exemplary advantages of the disclosed coil-oscillator are the provision of a consistent desirable frequency (e.g., 50-60 Hz), less moving parts, reduction or avoidance of fluid leaks, reduction or elimination of mechanical losses, reduction in size and weight and high reliability. The forces of the coil oscillator may also be more balanced providing an improvement in mechanical wear as compared to an electrically or hydraulically driven eccentric drive with an offset weight.

It will also be appreciated that this disclosure is not limited to rail vehicles that perform tamping operations. For example, any rail operation that can benefit from oscillatory actuation can also realize advantages of the present disclosure. It will further be appreciates that this disclosure is not limited to rail vehicles and the disclosed vibration unit may be used in any application, for example, it may be used to provide lateral oscillations in a track stabilizer. It may also be used to provide vertical oscillation in a ballast compactor. It may also be used in other, non rail, application such as construction equipment like gravel packers, jack hammers, and so forth.

The breadth and scope of the present disclosure should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A system comprising:
   a workhead; and
   a vibration unit coupled to the workhead, the vibration unit comprising:
      a rotor;
      a stator;
      a first rotor coil coupled to the rotor, the first rotor coil disposed at a first side of a shaft coupled to the rotor;
      a second rotor coil coupled to the rotor, the second rotor coil disposed at a second opposing side of the shaft;
      a first stator coil coupled to the stator, the second rotor coil disposed proximal to the first stator coil; and
      a second stator coil coupled to the stator, the second rotor coil disposed proximal to the second stator coil.

2. The system of claim 1, further comprising:
   a rail maintenance vehicle comprising:
      a frame having wheels that travel along rails;
      the workhead; and
      the vibration unit.

3. The system of claim 1, where the workhead comprises a tamper.

4. The system of claim 1, where the vibration unit further comprises:
   a flexible conductor coupled between the first rotor coil and the first stator coil.

5. The system of claim 1, where the rotor includes a concave pole face.

6. The system of claim 5, where the stator includes a convex pole face.

7. The system of claim 6, where the concave pole face of the rotor is disposed adjacent to the convex pole face of the stator.

8. The system of claim 1, where the vibration unit further comprises:
   a controller configured to alternatingly cause the first rotor coil and the first stator coil to have a same polarity and the second rotor coil and the second stator coil to have a same polarity.

9. The system of claim 1, where the vibration unit further comprises:
   a controller configured to alternatingly cause the first rotor coil and the first stator coil to have opposite polarity and the second rotor coil and the second stator coil to have opposite polarity.

10. The system of claim 1, where the vibration unit further comprises:
    a first half wave rectifier coupled to the first rotor coil and the first stator coil; and
    a second half wave rectifier coupled to the second rotor coil and the second stator coil.

11. The system of claim 10, where the vibration unit further comprises:
    a controller comprising the first half wave rectifier and the second half wave rectifier.

12. The system of claim 1, where the vibrating unit further comprises:
    a controller configured to vary at least one of a frequency, voltage, and current supplied to at least one of the first rotor coil, the second rotor coil, the first stator coil, and the second stator coil.

13. A method comprising:
    alternatingly causing a first rotor coil and a first stator coil of a vibration unit of a rail maintenance vehicle to have a first state, the vibration unit comprising a rotor, a stator, the first rotor coil coupled to the rotor, a second rotor coil coupled to the rotor, the first stator coil coupled to the stator and proximal to the first rotor coil, and a second stator coil coupled to the stator and proximal to the second rotor coil; and
    alternatingly causing the second rotor coil and the second stator coil to have a second state.

14. The method of claim 13, where:
    the first state corresponds to a first polarity; and
    the second state correspond to a second polarity.

15. The method of claim 13, further comprising:
    causing the first rotor coil and the first stator coil to have the second state when the second rotor coil and the second stator coil have the first state.

16. The method of claim 13, further comprising:
varying at least one of a frequency, voltage, and current supplied to at least one of the first rotor coil, the second rotor coil, the first stator coil, and the second stator coil.

17. A vibration unit configured to be coupled to a workhead of a vehicle, the vibration unit comprising:
a rotor;
a stator;
a first rotor coil coupled to the rotor, the first rotor coil disposed at a first side of a shaft coupled to the rotor;
a second rotor coil coupled to the rotor, the second rotor coil disposed at a second opposing side of the shaft;
a first stator coil coupled to the stator, the first rotor coil disposed proximal to the first stator coil; and
a second stator coil coupled to the stator, the second rotor coil disposed proximal to the second stator coil.

18. The vibration unit of claim 17, further comprising:
a flexible conductor coupled between the first rotor coil and the first stator coil.

19. The vibration unit of claim 17, where:
the rotor includes a concave pole face;
the stator includes a convex pole face; and
the concave pole face of the rotor is disposed adjacent to the convex pole face of the stator.

20. The vibration unit of claim 17, further comprising:
a controller configured to alternatingly cause the first rotor coil and the first stator coil to have a same polarity and the second rotor coil and the second stator coil to have a same polarity.

\* \* \* \* \*